US011320816B2

(12) United States Patent
Khanna

(10) Patent No.: US 11,320,816 B2
(45) Date of Patent: May 3, 2022

(54) SYSTEM AND METHOD FOR TRAFFIC LIGHT DETECTION AND COMMUNICATION

(71) Applicant: Honda Motor Co., Ltd., Tokyo (JP)

(72) Inventor: Rahul Khanna, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 16/919,667

(22) Filed: Jul. 2, 2020

(65) Prior Publication Data
US 2022/0004186 A1 Jan. 6, 2022

(51) Int. Cl.
| | | |
|---|---|---|
| *G05D 1/00* | (2006.01) | |
| *G01J 3/50* | (2006.01) | |
| *G01J 3/02* | (2006.01) | |
| *B60W 60/00* | (2020.01) | |
| *B60W 40/02* | (2006.01) | |
| *G08G 1/095* | (2006.01) | |
| *E01F 9/30* | (2016.01) | |

(52) U.S. Cl.
CPC ........... *G05D 1/0022* (2013.01); *B60W 40/02* (2013.01); *B60W 60/0025* (2020.02); *G01J 3/0275* (2013.01); *G01J 3/505* (2013.01); *G05D 1/0027* (2013.01); *G08G 1/095* (2013.01); *B60W 2552/00* (2020.02); *B60W 2555/60* (2020.02); *E01F 9/30* (2016.02)

(58) Field of Classification Search
CPC .............. G05D 1/0022; G05D 1/0027; B60W 60/0025; B60W 40/02; G01J 3/0275; G01J 3/505; G08G 1/095
See application file for complete search history.

(56) References Cited

U.S. PATENT DOCUMENTS

| | | |
|---|---|---|
| 6,144,317 A | 11/2000 | Sims |
| 7,649,161 B2 | 1/2010 | Keh et al. |
| 9,679,482 B2 | 6/2017 | Werner et al. |
| 10,078,960 B2 | 9/2018 | Tandai et al. |

FOREIGN PATENT DOCUMENTS

| | | |
|---|---|---|
| CN | 106530772 | 3/2017 |
| JP | 3299314 | 7/2002 |
| JP | 3634554 | 3/2005 |
| KR | 101048803 | 7/2011 |

*Primary Examiner* — Curtis B Odom
(74) *Attorney, Agent, or Firm* — Rankin, Hill & Clark LLP

(57) ABSTRACT

An auxiliary device and system for traffic light detection and communication. The auxiliary device is positionable adjacent to a traffic light. The auxiliary device includes at least one light pipe positionable adjacent to at least one traffic indicator disposed on a surface of the traffic light. The at least one light pipe is capable of carrying a light output from the least one traffic indicator to the auxiliary device. The auxiliary device includes a sensor for sensing the light output, and a processor operatively connected for computer communication to the sensor. The processor receives a measurement from the sensor. The measurement is associated with the light output. The processor detects a state of the light output based on the measurement, and transmits the state to one or more remote vehicles.

20 Claims, 3 Drawing Sheets

SYSTEM AND METHOD FOR TRAFFIC LIGHT DETECTION AND COMMUNICATION

BACKGROUND

Traffic lights are devices placed along, beside, or above a roadway to guide, warn, and regulate the flow of traffic, which includes motor vehicles, motorcycles, bicycles, pedestrians, and other road users. Most traffic light arrangements are positioned so that oncoming vehicles can view visual instructions (e.g., activated lights) provided by the traffic lights. Some vehicles use detection techniques (e.g., cameras, sensors) to detect traffic lights and/or traffic signs for use in controlling vehicle systems. For example, some Advanced Driver Assistance Systems (ADAS) can use detection of traffic lights and/or traffic signs to provide vehicle safety and convenience functions. However, certain factors can produce skewed results from traffic light detection techniques. For example, obstructions, glare, and weather, can prevent vehicles from accurately detecting traffic lights and visual instructions.

BRIEF DESCRIPTION

According to one aspect, an auxiliary device is removably attached to a traffic light. The auxiliary device includes a housing positionable adjacent to a front surface of the traffic light. The front surface of the traffic light includes a first traffic indicator, a second traffic indicator, and a third traffic indicator. The first light pipe is attached to the housing and has a first light entry to allow a first light output from the first traffic indicator to pass into the first light pipe through the first light entry. A second light pipe attached to the housing has a second light entry to allow a second light output from the second traffic indicator to pass into the second light pipe through the second light entry. A third light pipe attached to the housing has a third light entry to allow a third light output from the third traffic indicator to pass into the third light pipe through the third light entry. The auxiliary device also includes a sensor disposed in the housing for sensing at least one of the first light output, the second light output, and the third light output. Further, the auxiliary device includes a processor disposed in the housing and operably connected for computer communication to the sensor.

The processor receives a measurement from the sensor. The measurement is associated with the at least one of the first light output, the second light output, and the third light output. The processor determines, based on the measurement, a state of the at least one of the first light output, the second light output, and the third light output. Further, the processor transmits the state to one or more remote vehicles in proximity to the traffic light.

According to another aspect, an auxiliary device is positionable adjacent to a traffic light. The auxiliary device includes at least one light pipe positionable adjacent to at least one traffic indicator disposed on a surface of the traffic light. The at least one light pipe is capable of carrying a light output from the least one traffic indicator to the auxiliary device. The auxiliary device includes a sensor for sensing the light output, and a processor operatively connected for computer communication to the sensor. The processor receives a measurement from the sensor. The measurement is associated with the light output. The processor detects a state of the light output based on the measurement, and transmits the state to one or more remote vehicles.

According to a further aspect, a system for traffic light detection and communication includes a traffic light having a first traffic indicator, a second traffic indicator, and a third traffic indicator. The system includes an auxiliary device with at least one light pipe positionable adjacent to at least one of the first traffic indicator, the second traffic indicator, and the third traffic indicator. The at least one light pipe is capable of carrying a light output from the least one of the first traffic indicator, the second traffic indicator, and the third traffic indicator to a sensor. The system includes a processor operatively connected for computer communication to the traffic light, the auxiliary device, and the sensor. The processor receives a measurement about the light output from the sensor and determines a state of the light output based on the measurement. Further, the processor communicates the state using a communication network to one or more remote vehicles.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
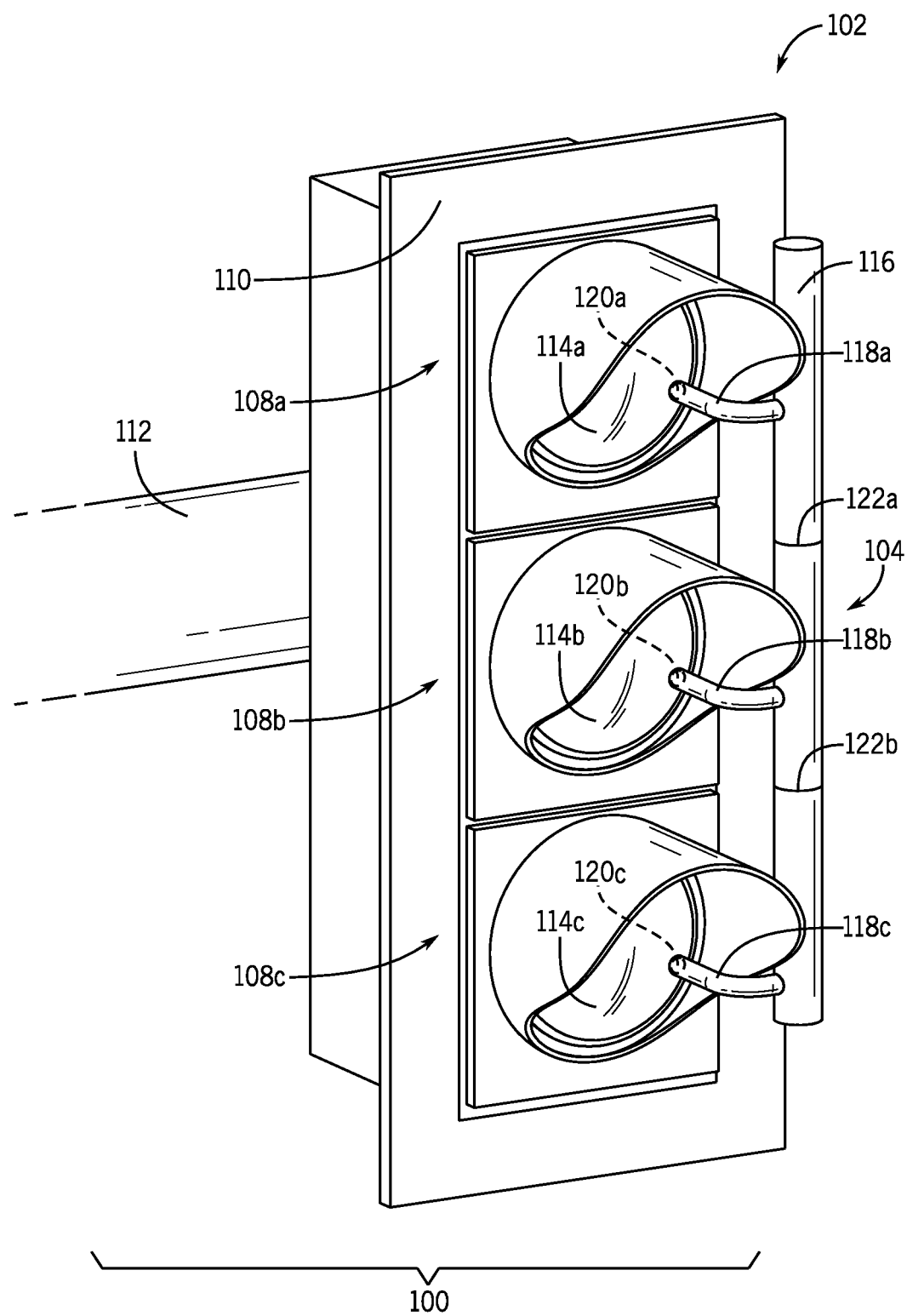
FIG. 1 illustrates an exemplary auxiliary device and a traffic light according to one embodiment.

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area Network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, a car-to-everything (C2X), a car-to-infrastructure (C2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (M IMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Persistent storage," as used herein may be, for example, a magnetic disk drive, a solid-state disk drive, a floppy disk drive, a tape drive, a Zip drive, a flash memory card, and/or a memory stick. Furthermore, the persistent storage may be a CD-ROM (compact disk ROM), a CD recordable drive (CD-R drive), a CD rewritable drive (CD-RW drive), and/or a digital video ROM drive (DVD ROM). The persistent storage may store an operating system that controls or allocates resources of a computing device.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

"Vehicle control system," and/or "vehicle system," as used herein may include, but is not limited to, any automatic or manual systems that may be used to enhance the vehicle, driving, and/or security. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Referring now to the drawings, wherein the showings are for purposes of illustrating one or more exemplary embodiments and not for purposes of limiting same, FIG. 1 illustrates an exemplary traffic light detection system 100 including a traffic light 102 and an auxiliary device 104 according to an exemplary embodiment. The traffic light 102 includes a housing 106 and three traffic indicators, namely, a first traffic indicator 108a, a second traffic indicator 108b, and a third traffic indicator 108c. In FIG. 1, the first traffic indicator 108a, the second traffic indicator 108b, and the third traffic indicator 108c are integrated with the traffic light 102 on a front-facing surface 110 of the housing 106. The traffic light 102 is supported by a rod 112 and can be positioned above or beside a traffic intersection, so that vehicles and other road users can view the traffic light 102. Although not shown in FIG. 1, the traffic light 102 can be connected to a traffic signal pole or other type of support. Cables, and wires, for example, for transmitting power and/or data can be disposed and/or routed through the traffic light 102 and/or the rod 112.

The traffic light 102 can include one or more light sources (not shown) that emit light output through each of the traffic light indicators. The light output can be provided in different patterns, intensities, wavelengths, frequencies, and/or colors. The light output can be controlled to periodically alternate in a cycle according to a traffic timing. In one embodiment, each traffic light indicator includes a lens having a particular color so that light output from the traffic light indicators is of the particular color. More specifically, in FIG. 1, the first traffic indicator 108a has a first lens 114a, the second traffic indicator 1008b has a second lens 114b, and the third traffic indicator 108c has a third lens 114c. As an illustrative example with reference to FIG. 1, the first lens 112a is provided with a red color, the second lens 112b is provided with a yellow color, and the third lens 112c is provided with a green color. Accordingly, a first light output from the first traffic indicator 108a emits a red color (e.g., a red light output), a second light output from the second traffic indicator 108b emits a yellow color (e.g., a yellow light output), and a third light output from the third traffic indicator 108c emits a green color (e.g., a green light output). It is understood that the traffic light 102, the first traffic indicator 108a, the second traffic indicator 108b, and the third traffic indicator 108c can take a variety of forms other than that shown in FIG. 1. Thus, the devices, systems, and methods described herein can be implemented with different traffic light arrangements and systems than those shown.

As shown in FIG. 1, the auxiliary device 104 includes a housing 116 that is positionable adjacent to the traffic light 102 and/or the housing 106, specifically, adjacent to the front-facing surface 110 of the traffic light 102. Here the housing 116 is cylindrically in shape, but it is understood that the housing 116 can be rectangular or take the form of other shapes. As will be discussed in more detail with FIG. 2, the housing 116 contains electronics and sensors used to detect properties (e.g., color) of a traffic signal (e.g., a light output) emitted from the traffic light 102 and communicate same.

In FIG. 1, the auxiliary device 104 includes one or more light pipes (e.g., light guides, light tubes) that transmit light from a light source (e.g., a traffic indicator). The light pipes allows for bending of light at a loss (e.g., 40%). The light pipes can be comprised of flexible or rigid materials. Each light pipe includes an opening at a distal end of the light pipe for allowing the light to enter the light pipe and ultimately be carried to a destination (e.g., the housing 116). In FIG. 1, the auxiliary device 104 includes a first light pipe 118a, a second light pipe 118b, and a third light pipe 118c. The first light pipe 118a is attached to the housing 116 and has a first light entry 120a. The first light entry 120a is an opening at a distal end of the first light pipe 118a. The first light entry 120a is positioned adjacent to the first traffic indicator 108a so that the first light output emitted from the first traffic indicator 108a can enter the first light entry 120a and travel through the first light pipe 118a to the housing 116. Thus, the first light entry 120a allows the first light output from the first traffic indicator 108a to pass into the first light pipe 118a through the first light entry 120a.

Similarly, the second light pipe 118b is attached to the housing 116 and has a second light entry 120b. The second light entry 120b is an opening at a distal end of the second light pipe 118b. The second light entry 120b is positioned adjacent to the second traffic indicator 108b so that the second light output emitted from the second traffic indicator 108b can enter the second light entry 120b and travel through the second light pipe 118b to the housing 116. Thus, the second light entry 120b allows the second light output from the second traffic indicator 108b to pass into the second light pipe 118b through the second light entry 120b. Further, the third light pipe 118c is attached to the housing 116 and has a third light entry 120c. The third light entry 120c is an opening at a distal end of the third light pipe 118c. The third light entry 120c is positioned adjacent to the third traffic indicator 108c so that the third light output emitted from the third traffic indicator 108c can enter the third light entry 120c and travel through the third light pipe 118c to the housing 116. Thus, the third light entry 120c allows the third light output from the third traffic indicator 108c to pass into the third light pipe 118c through the third light entry 120c.

As shown in FIG. 1, the auxiliary device 104 is removably attached to the traffic light 102 by a first bracket 122a and a second bracket 122b. The housing 116 is positionable adjacent to the front-facing surface 110 of the housing 106. This allows each of the light pipes of the auxiliary device 104 to be positioned adjacent to the traffic light indicators of the traffic light 102 as described above. As shown in FIG. 1, the housing 116 is positioned with respect to the traffic light 102 so that the housing 116 protrudes from the front-facing surface 110 of the traffic light 102. Here, the housing 116 does not rest on the housing 106 of the traffic light 102. Thus, the auxiliary device 104 and/or the housing 116 can be configured for retro-fitting onto the traffic light 102. This allows the auxiliary device 104 to be used as an after-market product with a wide variety of different traffic light arrangements governed by different federal and/or state regulations. It is understood that the auxiliary device 104 can be attached and/or positioned relative to the traffic light 102 using other mechanisms not shown in FIG. 1. In one example, the auxiliary device 104 can be attached and/or supported by the rod 112 or another type of traffic light support (e.g., cable, pole). This allows the auxiliary device 104 to be positioned adjacent to the traffic light 102 without physical contact between the auxiliary device 104 and the traffic light 102. Accordingly, the auxiliary device 104 is configured to be used on traffic lights in jurisdictions that do not allow altering of traffic lights.

Figure 2:
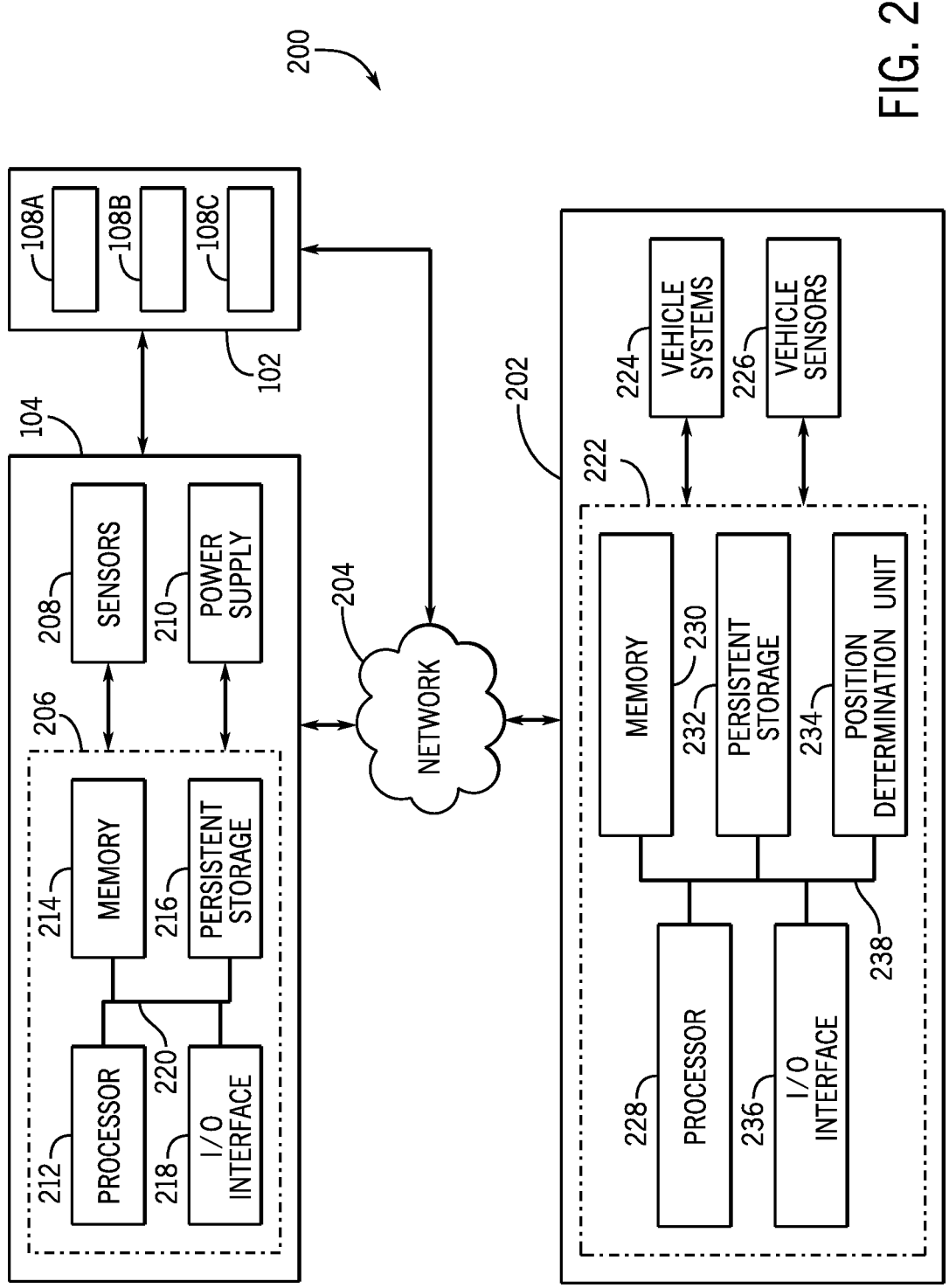
FIG. 2 is a block diagram of an exemplary system for traffic light detection and communication according to one embodiment.

As mentioned above, the light pipes of the auxiliary device 104 carry light output to the housing 116 for light detection and communication. The light detection and communication functionality will now be described in more detail with FIG. 2. FIG. 2 illustrates a block diagram of a system 200 for traffic light detection and communication and will be described with reference to the components of FIG. 1. In FIG. 2, the system 200 includes the traffic light 102, the auxiliary device 104, and a remote vehicle 202, each of which operably connected for computer communication, for example, using a network 204. Although one remote vehicle is shown in FIG. 2, it is understood that more than one remote vehicle can be implemented.

The auxiliary device 104 includes a control unit 206, sensors 208, and a power supply 210. The control unit 206 includes a processor 212, a memory 214, a persistent storage 216, and an input/output (I/O) interface 218, each of which are operatively connected for computer communication using, for example, a bus 220, or other wired and/or wireless interfaces described herein. One or more of the components of the control unit 206, the sensors 208 and/or the power supply 210 can be disposed in the housing 116.

The sensors 208 are disposed in the housing 116 for sensing light output from the traffic light 102. Specifically, the sensors 208 are for sensing one or more of the first light output, the second light output, and/or the third light output. Generally, the sensors 208 sense and measure a stimulus (e.g., a signal, a state, a property, a measurement, a quantity) associated with the traffic light 102. For example, the sensors 208 sense and measure a state associated with light output from traffic light 102. More specifically, the sensors 208 can sense and measure a state associated with one or more of the first light output, the second light output, and/or the third light output. A state can include, but is not limited to, a pattern (e.g., ON/OFF blinking pattern), an intensity, a wavelength, a frequency, a color and/or a timing of the first light output, the second light output, and/or the third light output. The sensors 208 can generate a data stream and/or a signal representing the stimulus, analyze the signal and/or transmit the signal to another component, for example the control unit 206 and/or the processor 212.

In the embodiments discussed herein the sensors 208 can be a Red, Green, Blue (RGB) sensor. The sensors 208 can include a single sensor, multiple sensors, or can be a part of a larger sensing system. In another embodiment, the sensors 208 can be a solar cell sensor. In some scenarios, a solar cell sensor can be more cost efficient and have a longer life than RGB sensors. In further embodiments, the sensors 208 can include the solar cell sensors as a backup to the RGB sensors.

The power supply 210 is operatively connected to the auxiliary device 104 for providing power to the auxiliary device 104. In the embodiment shown in FIG. 2, the power supply 210 is a component of the auxiliary device 104 (e.g., disposed in the housing 116). However, in other embodiment, the power supply 210 can be a power source (now shown) associated with the traffic light 102. For example, power can be draw through cables and wires routed through the rod 112 and/or through the traffic light 102, or another support structure (e.g., a traffic light pole). The power supply 210 can be any type of power source or battery.

Referring again to the control unit 206, the processor 212 can include logic circuitry with hardware, firmware, and software architecture frameworks for facilitating control of the auxiliary device 104 and facilitating communication between the traffic light 102, the auxiliary device 104, and the remote vehicle 202. Thus, in some embodiments, the processor 212 can store application frameworks, kernels, libraries, drivers, application program interfaces, among others, to execute and control hardware and functions discussed herein. In some embodiments, the memory 214 and/or the persistent storage 216 (e.g., disk, database, data store) can store similar components as the processor 212 for execution by the processor 212.

The I/O interface 218 can include network interface controllers (not shown) and other hardware and software that manages and/or monitors connections and controls bi-directional data transfer between the I/O interface 218 and other components of the system 200 using, for example, the network(s) 204. In particular, the I/O interface 218 can facilitate communication (e.g., exchange data) with other vehicles (e.g., the remote vehicle 202) and/or devices (e.g., the traffic light 102, third-party servers (not shown)), using any type of communication hardware and/or protocols discussed herein.

As described above, the auxiliary device can communicate information about the traffic light (e.g., a state, a property) to one or more remote vehicles. The remote vehicle of FIG. 2 will now be described in more detail. The remote vehicle 202 includes a vehicle computing device (VCD) 222, vehicle systems 224, and vehicle sensors 226. Generally, the VCD 222 includes a processor 228, a memory 230, a persistent storage 232, a position determination unit 234, and an Input/Output (I/O) interface (I/F) 236, which are each operably connected for computer communication via a bus 238 and/or other wired and wireless technologies discussed herein. The VCD 222, can include provisions for processing, communicating and interacting with various components of the remote vehicle 202 and other components of the system 200, including the traffic light 102 and the auxiliary device 104.

The processor 228 can include logic circuitry with hardware, firmware, and software architecture frameworks for facilitating control of the remote vehicle 202 and facilitating communication between the remote vehicle 202 and the traffic light 102 and/or the auxiliary device 104. Thus, in some embodiments, the processor 228 can store application frameworks, kernels, libraries, drivers, application program interfaces, among others, to execute and control hardware and functions discussed herein. In some embodiments, the memory 230 and/or the persistent storage 232 can store similar components as the processor 228 for execution by the processor 228.

The position determination unit 234 can include hardware (e.g., sensors) and software to determine and/or acquire position data about the remote vehicle 202 For example, the position determination unit 234 can include a global positioning system (GPS) unit (not shown) and/or an inertial measurement unit (IMU) (not shown). Furthermore, the I/O interface 236 can include software and hardware to facilitate data input and output between the components of the VCD 222 and other components of the system 200. Specifically, the I/O interface 236 can include network interface controllers (not shown) and other hardware and software that manages and/or monitors connections and controls bi-directional data transfer between the I/O interface 236 and other components of the system 200 using, for example, the network 204. In particular, the I/O interface 236 can facilitate communication (e.g., exchange data and/or transmit messages) with the traffic light 102 and/or the auxiliary device 104, using any type of communication hardware and/or protocols discussed herein.

Referring again to the remote vehicle 202, the vehicle systems 224 can include any type of vehicle control system and/or system described herein to enhance the remote vehicle 202 and/or driving of the remote vehicle 202. For example, the vehicle systems 224 can include autonomous driving systems, advanced driving assistance systems (ADAS), adaptive cruise control systems, lane departure warning systems, merge assist systems, freeway merging, exiting, and lane-change systems, collision warning systems, integrated vehicle-based safety systems, and automatic guided vehicle systems, among others. Furthermore, the vehicle sensors 226, can include various types of sensors for use with the remote vehicle 202 and/or the vehicle systems 224 for detecting and/or sensing a parameter of the remote vehicle 202, the vehicle systems 224, and/or the environment surrounding the remote vehicle 202.

Figure 3:
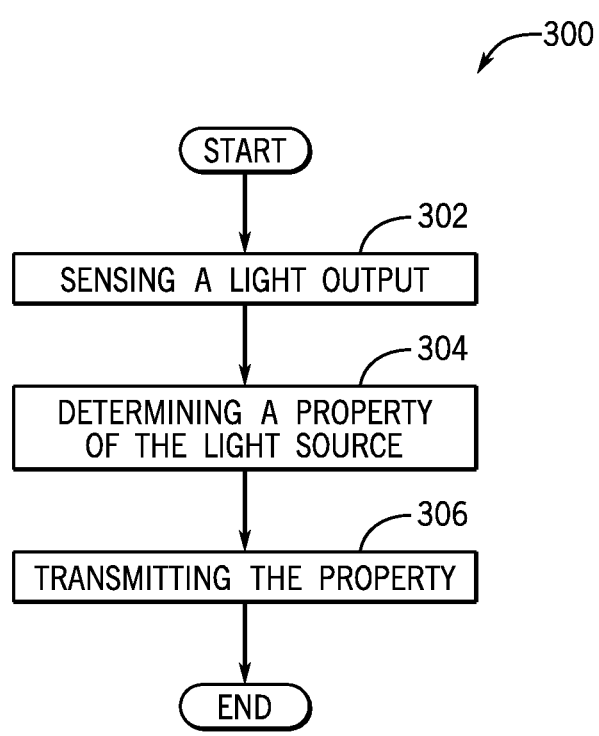
FIG. 3 is a process flow diagram of an exemplary method for traffic light detection and communication according to one embodiment.

Referring now to FIG. 3, a process flow diagram of an exemplary method 300 for traffic light detection and communication is shown. FIG. 3 will be described with reference to FIGS. 1 and 2. At block 302, the method 300 includes sensing a light output. As discussed above with FIG. 2, the sensors 208 can sense a light output from the traffic light 102 and carried by a light pipe to the auxiliary device 104. For example, the sensors 208 can sense at least one of the first light output, the second light output, and the third light output. In one embodiment, the sensors 208 include an RGB sensor. In another embodiment, the sensors 208 include a solar cell sensor.

At block 304, the method 300 includes determining a state of the light output. For example, the processor 212 can receive a measurement from the sensors 208. The measurement is associated with the sensed light output described at block 302. For example, the measurement is associated with the first light output, the second light output, and the third light output. The processor 212 can determine, based on the measurement, a state of the at least one of the first light output, the second light output, and the third light output. For example, the processor 212 can determine a color of at least one of the first light output, the second light output, and the third light output. As mentioned above, the color can be red, yellow, and/or green.

Referring again to the example above, in one embodiment, the sensors 208 include an RGB sensor for sensing light output from the traffic light 102. In this embodiment, the measurement obtained from the RGB sensor can be compared to pre-determined threshold levels, which can be stored at the memory 214 and/or the persistent storage 216, for determining a color of the light output. Similarly, in examples where the measurement is obtained from the solar cell sensor, the measurement can be compared to pre-determined threshold levels, which can be stored at the memory 214 and/or the persistent storage 216, for determining a color of the light output.

In further embodiments, the state can also include other information about the traffic light 102. For example, traffic cycle and timing information can be obtained from the traffic light 102 and/or a remote server (not shown) operatively connected for computer communication to the network 204. As will be described herein, this additional information can also be transmitted (e.g., in addition to the color) to one or more remote vehicles.

At block 306, the method 300 includes transmitting the state. More specifically, the processor 212 can transmit and/or broadcast the state to one or more remote vehicles (e.g., the remote vehicle 202). In one embodiment, the processor 212 communicates the information about the traffic light 102 (e.g., the state, the property) using the I/O interface 218 and the network 204. In some embodiments, the processor 212 communicates the information about the traffic light 102 (e.g., the state, the property) over a predefined frequency. For example, in some embodiments, the information is communicated when the traffic signal is activated at 900 mhz. Thus, if the remote vehicle 202 is within a predetermined range of the traffic light 102 and/or the auxiliary device 104, the remote vehicle 202 will receive the information broadcasted over the predefined frequency.

In some embodiments, the processor 212 transmits the information (e.g., the state, the property) to the remote vehicle 202 for use in controlling one or more vehicle systems 224, for example, an ADAS system. For example, the information can be used by the remote vehicle 202 to confirm information detected by the ADAS system. As an illustrative example, the ADAS system can include one or more of the vehicle sensors 226 (e.g., camera) for detecting the traffic light 102. The processor 228 and/or the ADAS system can determine a color emitted from the traffic light 102 based on the data captured by the vehicle sensors 226. In one embodiment, the processor 228 confirms the color captured by the remote vehicle 202 with the state (e.g., color) detected and transmitted by the auxiliary device 104. Based on the confirmation, the remote vehicle 202 can control one or more vehicle systems 224 accordingly. Thus, the auxiliary device provides data redundancy to the remote vehicle 202.

The embodiments discussed herein can also be described and implemented in the context of "computer-readable medium" or "computer storage medium." As used herein, "computer-readable medium" or "computer storage medium refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An auxiliary device removably attached to a traffic light, the auxiliary device comprising:
a housing positionable adjacent to a front surface of the traffic light, wherein the front surface of the traffic light includes a first traffic indicator, a second traffic indicator, and a third traffic indicator;

a first light pipe attached to the housing and having a first light entry to allow a first light output from the first traffic indicator to pass into the first light pipe through the first light entry;
a second light pipe attached to the housing and having a second light entry to allow a second light output from the second traffic indicator to pass into the second light pipe through the second light entry;
a third light pipe attached to the housing and having a third light entry to allow a third light output from the third traffic indicator to pass into the third light pipe through the third light entry;
a sensor disposed in the housing for sensing at least one of the first light output, the second light output, and the third light output; and
a processor disposed in the housing and operably connected for computer communication to the sensor, wherein the processor:
receives a measurement from the sensor, wherein the measurement is associated with the at least one of the first light output, the second light output, and the third light output;
determines, based on the measurement, a state of the at least one of the first light output, the second light output, and the third light output; and
transmits the state to one or more remote vehicles in proximity to the traffic light.

2. The auxiliary device of claim 1, wherein the processor determines, based on the measurement, a color of the at least one of the first light output, the second light output, and the third light output.

3. The auxiliary device of claim 1, wherein the first light output from the first traffic indicator is a red light output, the second light output from the second traffic indicator is a yellow light output, and the third light output from the third traffic indicator is a green light output.

4. The auxiliary device of claim 1, wherein the housing is configured for retro-fitting onto the traffic light.

5. The auxiliary device of claim 1, including a power supply operatively connected to the auxiliary device for providing power to the auxiliary device.

6. The auxiliary device of claim 1, wherein the sensor is a Red, Green, Blue sensor.

7. The auxiliary device of claim 1, wherein the processor is operatively connected for computer communication to the one or more remote vehicles using a communication network.

8. The auxiliary device of claim 1, wherein the processor transmits the state the one or more remote vehicles over a predefined frequency.

9. An auxiliary device positionable adjacent to a traffic light, the auxiliary device, including:
at least one light pipe positionable adjacent to at least one traffic indicator disposed on a surface of the traffic light, the at least one light pipe capable of transferring a light output from the least one traffic indicator;
a sensor for sensing the light output; and
a processor operatively connected for computer communication to the sensor, wherein the processor:
receives a measurement from the sensor, wherein the measurement is associated with the light output;
detects a state of the light output based on the measurement; and
transmits the state to one or more remote vehicles.

10. The auxiliary device of claim 9, wherein the auxiliary device is configured for retro-fitting onto the traffic light.

11. The auxiliary device of claim 9, wherein the processor detects a color of the light output based on the measurement, wherein the color is at least one of red, yellow, and green.

12. The auxiliary device of claim 9, wherein the processor transmits the state to the one or more remote vehicles for use in controlling a vehicle system of the one or more remote vehicles.

13. The auxiliary device of claim 9, wherein a power supply is operatively connected to the auxiliary device for providing power to the auxiliary device.

14. The auxiliary device of claim 9, wherein the processor is operatively connected for computer communication to the one or more remote vehicles.

15. The auxiliary device of claim 9, wherein the processor transmits the state by broadcasting the state to the one or more remote vehicles over a predefined frequency.

16. A system for traffic light detection and communication, including:
a traffic light having a first traffic indicator, a second traffic indicator, and a third traffic indicator;
an auxiliary device including at least one light pipe positionable adjacent to at least one of the first traffic indicator, the second traffic indicator, and the third traffic indicator, the at least one light pipe capable of carrying a light output from the least one of the first traffic indicator, the second traffic indicator, and the third traffic indicator to a sensor; and
a processor operatively connected for computer communication to the traffic light, the auxiliary device, and the sensor, wherein the processor:
receives a measurement about the light output from the sensor;
determines a state of the light output based on the measurement; and
communicates the state using a communication network to one or more remote vehicles.

17. The system of claim 16, wherein the processor determines a color of the light output based on the measurement.

18. The system of claim 16, wherein the auxiliary device is configured for retro-fitting onto the traffic light.

19. The system of claim 16, wherein the processor is operatively connected for computer communication to the one or more remote vehicles and the processor transmits the state to the one or more remote vehicles for controlling one or more vehicle systems of the one or more remote vehicles according to the state.

20. The system of claim 16, wherein the processor communicates the state by broadcasting the state using a predefined frequency.

* * * * *